(12) United States Patent
Shin et al.

(10) Patent No.: US 11,163,133 B2
(45) Date of Patent: Nov. 2, 2021

(54) CAMERA ACTUATOR AND COMPACT CAMERA INCLUDING SAME

(71) Applicant: JAHWA ELECTRONICS CO., LTD., Cheongju-si (KR)

(72) Inventors: Doo Sik Shin, Seoul (KR); Chang Wook Park, Ansan-si (KR); Hee Seung Kim, Seoul (KR)

(73) Assignee: JAHWA ELECTRONICS CO., LTD., Cheongju-si (KR)

( * ) Notice: Subject to any disclaimer, the term of this patent is extended or adjusted under 35 U.S.C. 154(b) by 0 days.

(21) Appl. No.: 17/015,409

(22) Filed: Sep. 9, 2020

(65) Prior Publication Data
US 2021/0072495 A1 Mar. 11, 2021

(30) Foreign Application Priority Data
Sep. 10, 2019 (KR) .................. 10-2019-0112228

(51) Int. Cl.
*G02B 7/09* (2021.01)
*H04N 5/225* (2006.01)
(Continued)

(52) U.S. Cl.
CPC .............. *G02B 7/09* (2013.01); *G02B 7/021* (2013.01); *H04N 5/2254* (2013.01); *H04N 5/23296* (2013.01)

(58) Field of Classification Search
CPC ...... G02B 7/09; G02B 7/021; G02B 13/0065; G02B 7/102; G02B 13/009; H04N 5/2254;
(Continued)

(56) References Cited

U.S. PATENT DOCUMENTS

| 2018/0367714 | A1 | 12/2018 | Im et al. | |
| 2020/0404181 | A1* | 12/2020 | Lee | ............... G03B 5/00 |
| 2021/0058537 | A1* | 2/2021 | Saito | ............... G02B 7/04 |

FOREIGN PATENT DOCUMENTS

| EP | 3 518 016 A2 | 7/2019 |
| JP | H09-121589 A | 5/1997 |

(Continued)

OTHER PUBLICATIONS

Extended European Search Report dated Feb. 18, 2021, in connection with corresponding EP Application No. 20195083.9; 10 pages.
(Continued)

*Primary Examiner* — Padma Haliyur
(74) *Attorney, Agent, or Firm* — Maier & Maier, PLLC

(57) ABSTRACT

A camera actuator for implementing automatic focusing and zooming, and a compact camera including the same. The camera actuator includes a base, at least one driving unit, and at least one optical unit. The base has an internal accommodation space, is open at both ends thereof in a direction in which light travels, and has at least one opening in one side surface thereof. The driving unit includes a substrate fitted in the opening of the base and mounted with at least one coil on a surface facing the internal accommodation space of the base. The optical unit is provided in the internal accommodation space of the base and configured to be movable in an optical axis direction. The optical unit is mounted with a magnet on a surface facing the substrate. The magnet is positioned to correspond to the coil. The substrate is mounted with two or more coils.

9 Claims, 7 Drawing Sheets

(51) Int. Cl.
*G02B 7/02* (2021.01)
*H04N 5/232* (2006.01)
(58) Field of Classification Search
CPC ............. H04N 5/23296; H04N 5/2253; H02K 41/031; H02K 11/215; G03B 5/02; G03B 13/36; G03B 17/12; G03B 2205/0007
See application file for complete search history.

(56) References Cited

FOREIGN PATENT DOCUMENTS

| | | |
|---|---|---|
| JP | 5834523 B2 | 12/2015 |
| KR | 10-2015-0122944 A | 11/2015 |
| KR | 10-2018-0012150 A | 2/2018 |
| KR | 10-1978946 B1 | 5/2019 |
| WO | 2020/174325 A2 | 9/2020 |

OTHER PUBLICATIONS

Office Action dated May 17, 2021 in corresponding Korean Application No. 10-2019-0112228; 12 pages including English-language translation.

* cited by examiner

CAMERA ACTUATOR AND COMPACT CAMERA INCLUDING SAME

CROSS-REFERENCE TO RELATED APPLICATIONS

The present application claims priority to Korean Patent Application No. 10-2019-0112228, filed Sep. 10, 2019, the entire contents of which is incorporated herein for all purposes by this reference.

FIELD

The present invention relates to a camera actuator. More particularly, the present invention relates to a camera actuator that moves an optical unit including an optical system to implement zooming or automatic focusing and to a compact camera including the same.

BACKGROUND

With the development of hardware technology and changes in a user environment or the like, portable (or mobile) terminals such as a smartphone have been equipped with various additional functions as well as a primary communication function. A typical example is a camera module equipped with various functions such as automatic focusing (AF), optical image stabilization (OIS), and the like.

In recent years, mobile terminals have been equipped with voice recognition, fingerprint recognition, and iris recognition functions for user authentication or security. In addition, there is an attempt of mounting a zoom lens composed of a plurality of lens groups on a mobile communication terminal to finely adjust the focus distance to a subject.

Unlike general-purpose lenses, a zoom lens has a structural feature in which a plurality of lenses or lens groups is arranged in an optical axis direction in which light is incident. For this reason, a zoom lens has a longer length in the optical axis direction than general-purpose lenses, thereby requiring an increase in the thickness of a mobile terminal to be equipped with the zoom lens in the case where the zoom lens is mounted in the mobile terminal in the same manner as general-purpose lenses. That is, when the zoom lens is mounted such that the multiple lenses or lens groups constituting the zoom lens are arranged in a direction perpendicular to the surface of a base substrate, the thickness of the mobile terminal needs to be increased to accommodate the difference in length between the zoom lens and the general-purpose lens.

Therefore, a compact camera configured such that lenses constituting a zoom lens are arranged in a direction perpendicular to the surface of a substrate, that is, a direction of thickness of the mobile terminal has a structural problem of incapable of satisfying a key feature (for example, thinner and lighter body) required for recent mobile terminals.

On the other hand, key factors affecting the zooming performance of a camera include not only the specifications of lenses constituting a zoom lens but also a driving range of an optical system. The zooming performance improves with the driving range of an optical system. In general, a conventional compact camera mounted with a zoom lens uses a stepping motor as a lens driving mechanism to increase the driving range of an optical system.

However, such a conventional method of using a stepping motor to increase the driving range has a problem of increasing the overall volume of a compact camera because the size of the stepping motor itself is large. That is, to accommodate a stepping motor having a large size, the overall volume of a compact camera needs to be increased.

In addition, the use of a stepping motor results in a rise in the cost of a compact camera because the stepping motor is expensive. In addition, since the stepping motor simply functions to move a lens, guide pins are additionally required to align the optical axes of lenses in a lens group. For this reason, the conventional approach of using a stepping motor has a disadvantage in terms of mass production because the lens driving mechanism using a stepping motor is structurally complex.

An example of the related art is Korean Patent No. 10-1978946 (Published on May 15, 2019)

SUMMARY

An objective of the present invention is to provide a camera actuator having a novel driving mechanism capable of sufficiently increasing a driving range (stroke in a direction of an optical axis) of an optical system while having a simple structure, and another objective of the present invention is to provide a compact camera including the camera actuator.

In order to accomplish one of the objectives of the present invention, one aspect of the present invention provides a camera actuator includes: a base having an internal accommodation space, being open at both ends thereof in a direction in which light travels, and having at least one opening in a first side surface thereof; at least one driving unit fitted in the opening of the base and including a substrate which is mounted with at least one coil on a first surface facing the internal accommodation space of the base; and at least one optical unit disposed in the internal accommodation space of the base and configured to be movable in an optical axis direction, the optical unit having a side surface that faces the substrate and on which a magnet is mounted at a position corresponding to the coil. In the driving unit, two or more coils are arranged at intervals in a first direction parallel to an optical axis, each of the coils has an air-core portion in the center thereof, and a Hall sensor that senses a magnetic force of the magnet and outputs a signal corresponding to the sensed magnetic force is mounted in the air-core portion of each of the coils.

Preferably, the at least one opening may include a first opening and a second opening formed in a first side surface and a second side surface facing each other, respectively, and the first opening and the second opening may be diagonally positioned. The at least one driving unit may include a first driving unit configured to cover the first opening and a second driving unit configured to cover the second opening. The at least one optical unit may include a first optical unit and a second optical unit arranged side by side in the accommodation space, in which the first optical unit is linearly movable in the optical axis direction within a range of an electric field generated by the coils of the first driving unit, and the second optical unit is linearly movable within a range of an electric field generated by the coils of the second driving unit.

Preferably, the driving unit may be composed of: the substrate on which two or more coils are arranged in the optical axis direction and two or more Hall sensors are mounted in the air-core portions of the two or more coils, respectively; a carrier yoke disposed in contact with a second surface of the substrate, the second surface being opposite to the first surface on which the coils are mounted;

and a rectangular frame-shaped body combined with the substrate and the carrier yoke and fitted in the opening of the base.

The camera actuator according to one embodiment of the present invention may further include a pair of ball guides disposed between the body of the driving unit and the optical unit. The ball guides may guide the optical unit to linearly move in the optical axis direction.

Preferably, each of the pair of ball guides may include: a first groove formed in a horizontal frame extending in the first direction parallel to the optical axis, among four frames of the body of the driving unit; a second groove formed in an outer surface of the optical unit at a position corresponding to the first groove; and one or more balls disposed between the first groove and the second groove facing each other.

Preferably, the driving unit may further include a driver IC mounted on the substrate. The driver IC may determine a control value for each of the coils on the basis of an input signal that is externally input and a signal transmitted from each of the Hall sensors and may control intensity and a direction of electric current supplied to each of the coils on the basis of the determined control values.

The driver IC may sequentially supply the electric current to each of the coils, starting from a coil that is closest to the optical unit in a direction of movement of the optical unit.

Preferably, the driver IC may supply the electric current, in one direction, to a coil that is closest to the optical unit so that a first force of pushing the optical unit in the direction of movement of the optical unit is generated and supplies the electric current, in the reverse direction, to a coil that is second closest to the optical unit so that a second force of pulling the optical unit in the direction of movement of the optical unit is generated.

The optical unit used in the present invention may include: a carrier equipped with a magnet mounted on a side surface thereof to enable linear movement of the optical unit in the optical axis direction; and a lens barrel containing a lens group including multiple lenses and provided in an accommodation hole formed in a center portion of the carrier.

In order to accomplish the other objective of the present invention, another aspect of the present invention provides a compact camera including: the camera actuator according to the former aspect described above; a reflectometer configured to change an optical path of light that is incident through the opening, thereby guiding the light to the optical unit of a zoom lens; and an image sensor module configured to receive light passing through the optical unit of the zoom lens and to output image information corresponding to the received light.

Wherein the two or more optical units constituting the camera actuator may be independently moved in the optical axis direction by the two or more driving units, respectively.

The camera actuator according to one embodiment of the present invention is a VCM camera actuator that continually moves an optical unit mounted with a magnet by arranging several coils in an optical axis direction. Therefore, the camera actuator according to one embodiment of the present invention can sufficiently increase the driving range (i.e., stroke) of the optical unit while having a simpler configuration than conventional stepping motor-type camera actuators, thereby improving the zooming performance.

In addition, such a simple structure compared to the conventional stepping motor-type camera actuators is advantageous in cost reduction and easy assembling, resulting in facilitation of mass production of camera actuators.

Furthermore, due to the attraction force between the magnet and the carrier yoke, the optical unit can move while being in close contact with the driving unit. In addition, since the movement of the optical unit is guided by rolling motion of the balls of the ball guide, guide pins for alignment of the optical axis are not required.

DETAILED DESCRIPTION OF THE EMBODIMENTS

Figure 1:
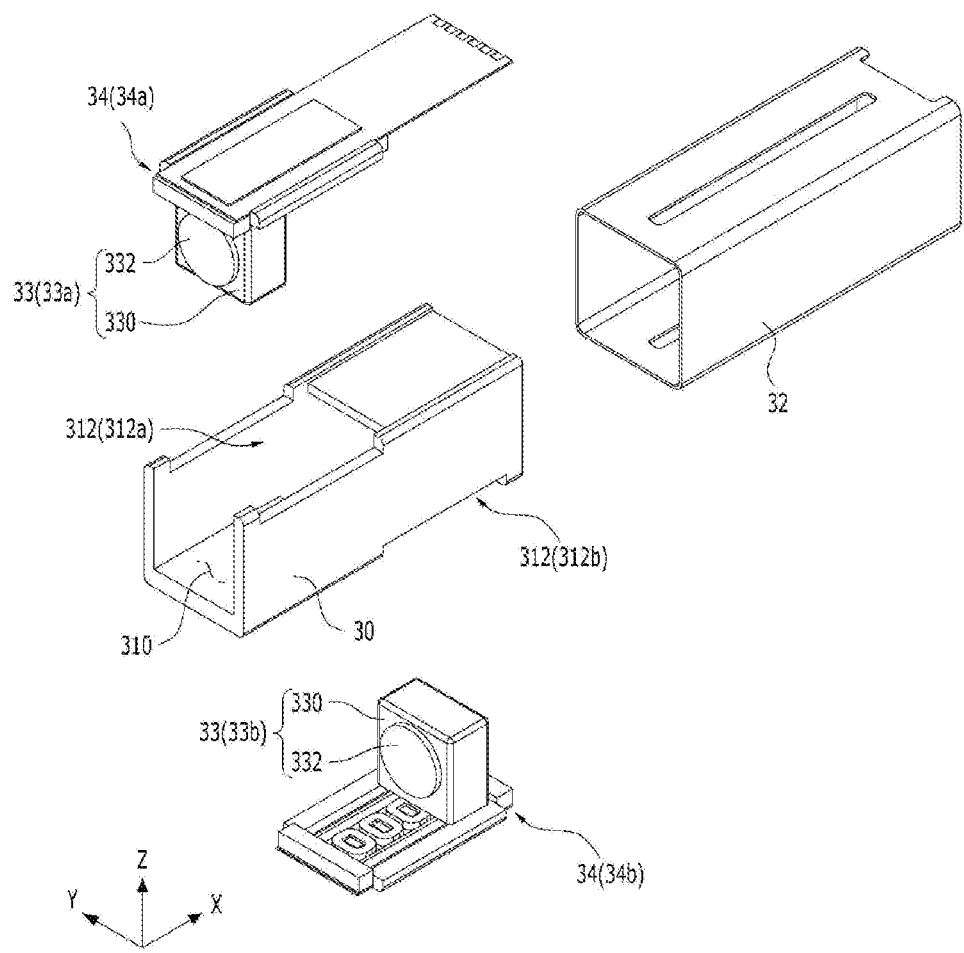
FIG. 1 is a partially exploded perspective view of a camera actuator according to a first aspect of the present invention.

The terms used in the present specification are merely used to describe specific embodiments and are not intended to limit the present invention. A singular expression includes a plural expression unless a description to the contrary is specifically pointed out in the context.

It will be further understood that the terms "comprise" and/or "have" when used in this specification, specify the presence of stated features, integers, operations, elements, and/or components, but do not preclude the presence or addition of one or more other features, integers, operations, elements, components, and/or groups thereof.

Also, terms including ordinal numbers such as first, second, etc. may be used to explain various elements. However, it will be appreciated that the elements are not limited to such terms. These terms are merely used to distinguish one element from another.

In addition, terms such as "~portion", "~unit", "~module", and "~block" stated in the specification may signify a unit to process at least one function or operation and the unit may be embodied by hardware, software, or a combination of hardware and software.

The exemplary embodiments of the invention will be described in detail with reference to the accompanying drawings. The same elements in the drawings will be referenced by the same reference signs and the description of the same elements will not be repeated.

For the convenience of description, a three-axis direction coordinate system will be used. In the drawings, it will be assumed that the X-axis represents an optical axis direction, the Z-axis represents a direction orthogonal to the X-axis which is the optical axis direction, and the Y-axis represents a direction that is orthogonal to the X-axis while being present on the same plane as the X-axis.

A camera actuator according to a first aspect of the present invention implements zooming-in and zooming-out by moving an optical system (hereinbelow, referred to as "optical unit") by an arbitrary distance in an optical axis direction by using an interaction between an electric field generated by multiple coils arranged at intervals in an optical axis direction and a magnetic field generated by a magnet.

In the following description of the present invention, a camera actuator including two optical units arranged in the optical axis direction and two driving units corresponding to the two optical units, respectively, will be described. The example is one preferred embodiment to illustrate the present invention and does not mean that the number of optical units and the number of drive units are limited to the example illustrated in the drawings.

In other words, although a camera actuator including two optical units and two driving units is described as a preferred embodiment of the present invention, the number of pairs of an optical unit and a driving unit is not limited to two. It may vary depending on the required specifications of a camera.

Figure 2:
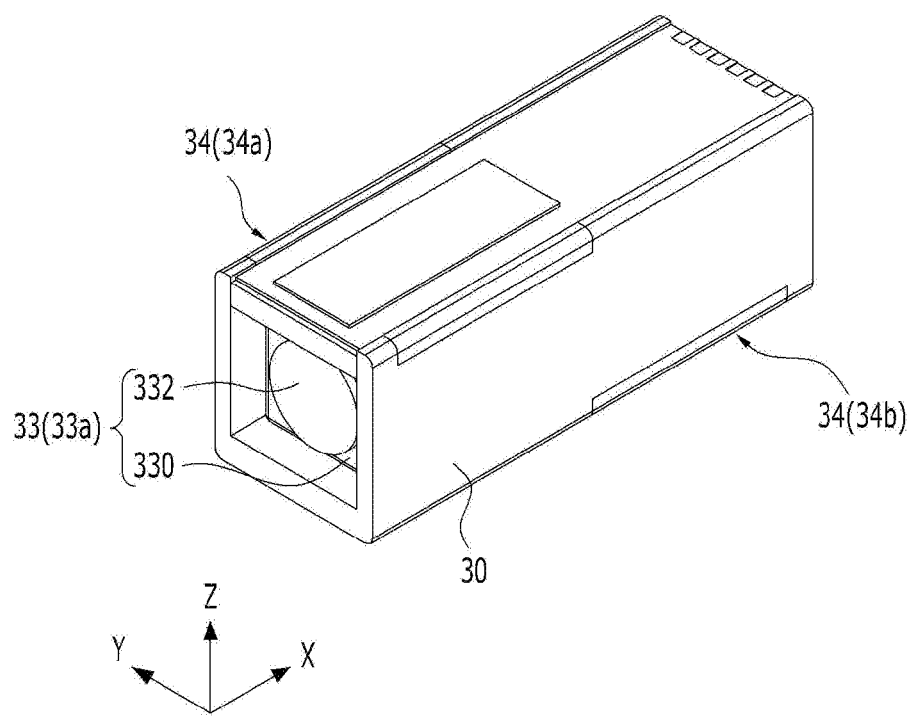
FIG. 2 is an assembled perspective view of the camera actuator illustrated in FIG. 1 from which a shielding can is eliminated.
Figure 3:
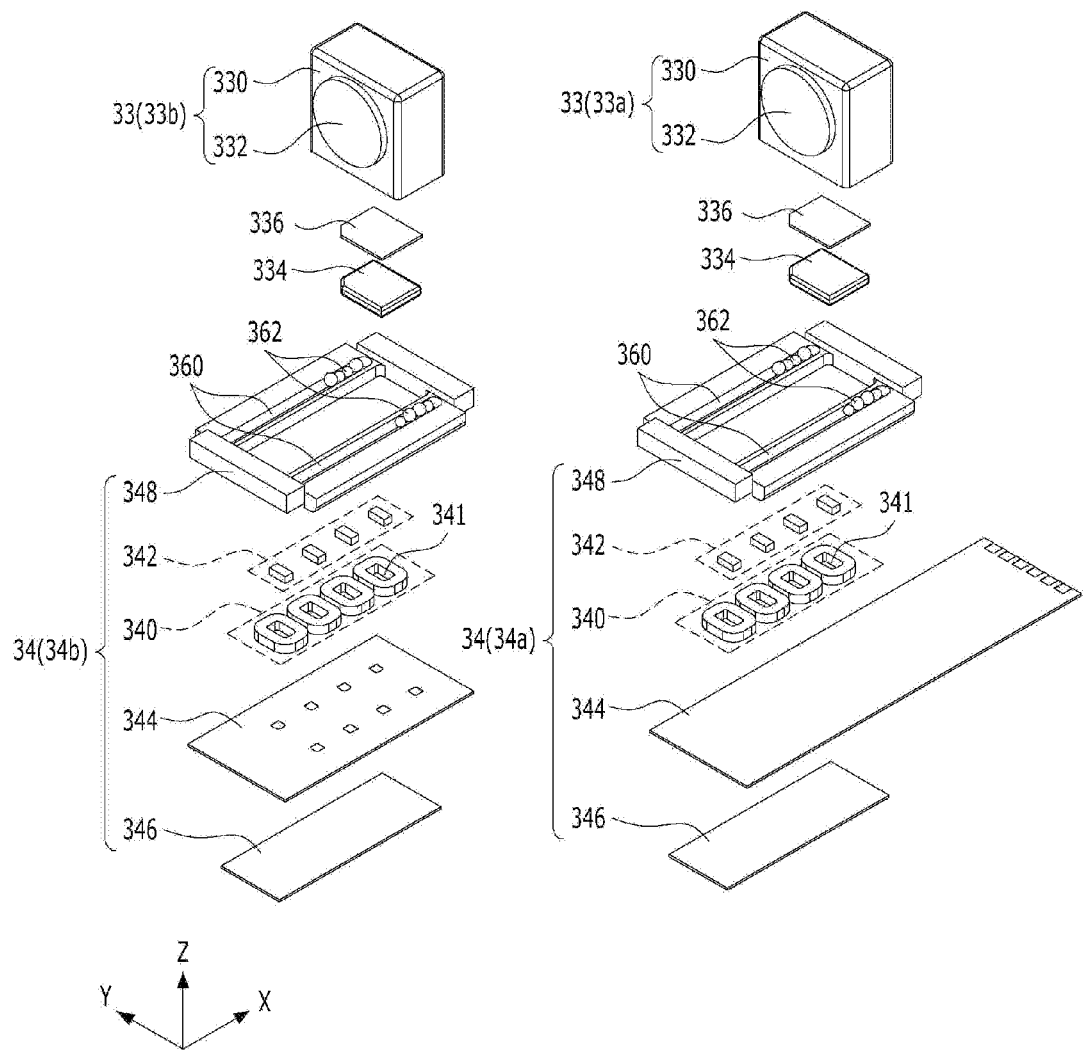
FIG. 3 is an exploded perspective view of a driving unit illustrated in FIG. 1.
Figure 4:
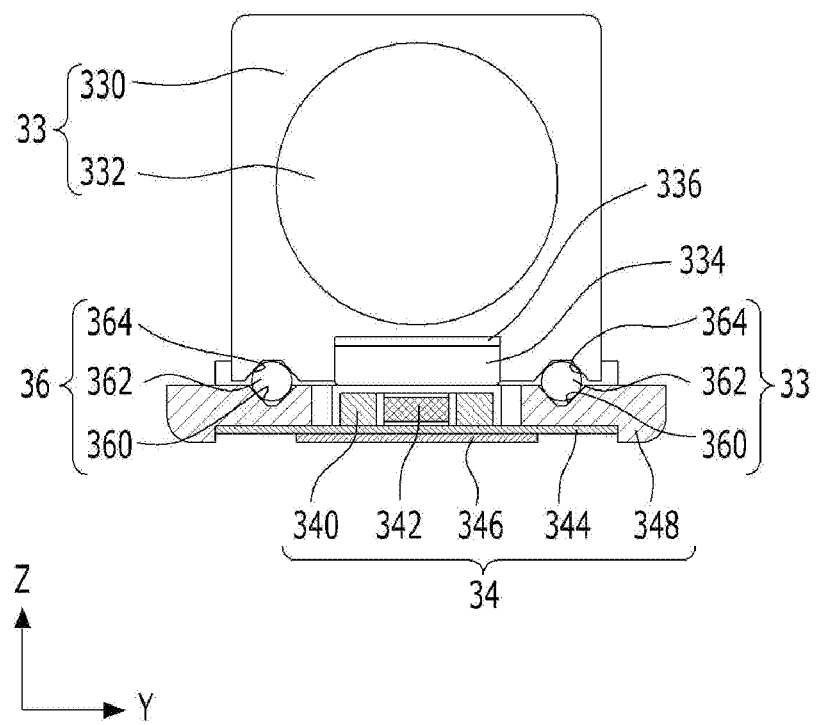
FIG. 4 is a diagram illustrating an assembled structure of an optical unit and a driving unit which are viewed from the optical axis direction in FIG. 1.
Figure 5A:
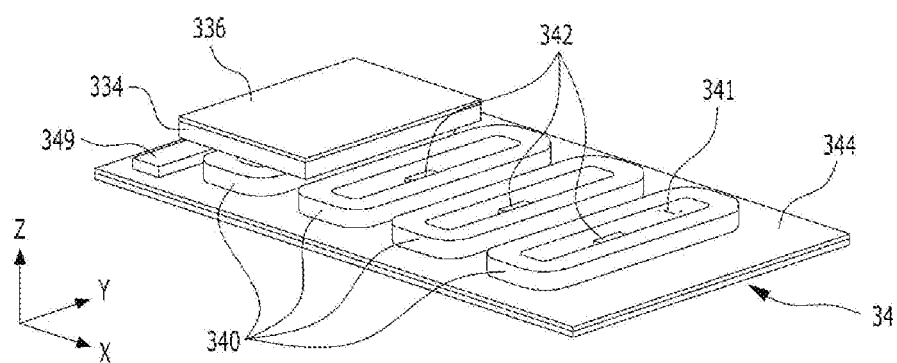
FIG. 5A is a conceptual view illustrating a key portion of the camera actuator according to the present invention.
Figure 5B:
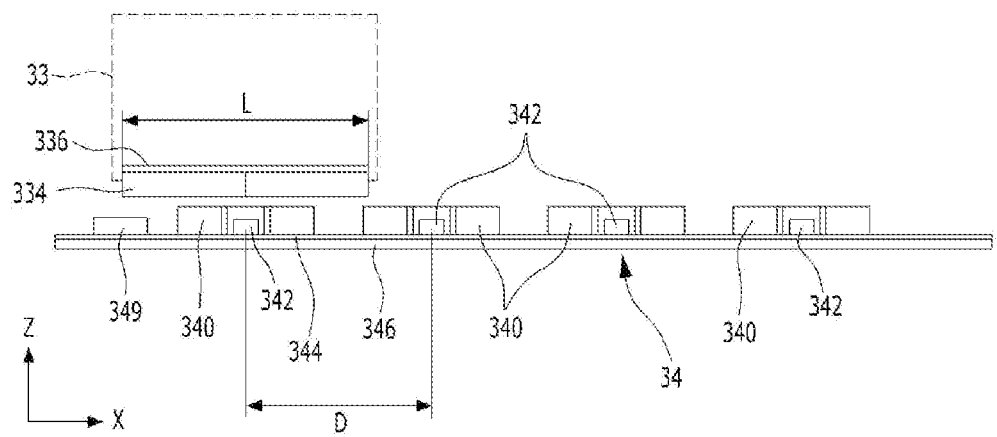
FIG. 5B is another conceptual view illustrating a key portion of the camera actuator according to the present invention.

FIG. 1 is a partially exploded perspective view of a camera actuator according to a first aspect of the present invention, and FIG. 2 is an assembled perspective view of the camera actuator of FIG. 1 from which a shielding can is eliminated FIG. 3 is an exploded perspective view of a driving unit illustrated in FIG. 1, and FIG. 4 is a diagram illustrating an assembled structure of an optical unit and a driving unit which are viewed from an optical axis direction in FIG. 1. FIG. 5 is a conceptual view illustrating a key portion of the camera actuator according to the first aspect of the present invention.

Referring to FIGS. 1 or FIG. 5, a camera actuator 3 according to the first aspect of the present invention includes a base 30. As illustrated in FIG. 1, the base 30 is an integrated single-component body which has an internal accommodation space, is open at both ends thereof in a direction in which light travels, and has at least one opening in one side surface (referred to as "first side surface" for convenience of description) thereof. Alternatively, the base 30 may be an assembled multi-component body formed by combining a bottom portion, side portions, and a top portion.

Preferably, the base 30 may have two openings 312a and 312b provided in the upper surface and the lower surface, respectively to expose the internal accommodation space 310 to the outside.

The two openings are referred to as a first opening 312a and a second opening 312b and are positioned at a first end portion of the upper surface of the base and a second end portion of lower surface of the base, respectively. The first end and the second end are opposite ends in the optical axis direction. Therefore, the first opening 312a and the second opening 312b are diagonally positioned. A driving unit 34 is fitted in each of the first opening 312a and the second opening 312b. That is, two driving units 34 are arranged in the optical axis direction and are diagonally positioned in a manner to be received in the two openings 312a and 312b, respectively.

Hereinafter, the two driving units 34 are referred to as a first driving unit 34a and a second driving unit 34b. The first driving unit 34a and the second driving unit 34b are combined with the base 30 through the first opening 312a and the second opening 312b, respectively. Each of the first and second driving units 34a and 34b includes a substrate 344 mounted with coils 340 on a first surface facing the internal accommodation space 310 of the base 30.

Preferably, the substrate 344 of each of the first and second driving units 34a and 34b is mounted with two or more coils that are arranged at uniform intervals in a first direction that is parallel to an optical axis.

Each of the coils 340 has an air-core portion 341 in the center thereof, and the substrate 344 is also mounted with multiple Hall sensors 342 that are disposed in the air-core portions 341 of the coils 340, respectively. The Hall sensors 342 disposed in the air-core portions 341 of the respective coils 340 sense a magnetic force of a magnet 334 combined with the optical unit which will be described later in detail, generates a signal corresponding to the magnetic force, and outputs the signal to the driver IC 349 which will be described later in detail.

Preferably, each of the first driving unit 34a and the second driving unit 34b includes: the substrate 344 on which the two or more coils 340 are mounted in a manner to be arranged in the optical axis direction and the two or more Hall sensors 342 are mounted in the air-core portions 341 of the respective coils 340; and a carrier yoke 346 in contact with a second surface of the substrate 344, the second surface being opposite to the first surface on which the coils 340 are mounted. Alternatively, each of the first and second driving units 34a and 34b may additionally include a rectangular frame-shaped body 348 on which the substrate 344 and the carrier yoke 346 are installed. The frame-shaped body 348 may be fitted in the first opening 312a or the second opening 312b of the base 31.

Each of the first driving unit 34a and the second driving unit 34b includes the driver IC 349 described above. The driver IC 349 is mounted at a peripheral portion of the substrate 344 constituting the driving unit 34, and determines a control value for each of the coils 340 on the substrate 344 on the basis of an input signal (camera driving instruction) that is externally input and signals transmitted from the respective Hall sensors 342. Each of the first driving unit 34a and the second driving unit 34b also controls the intensity and direction of electric current to be supplied to each of the coils 340 on the basis of the determined control value.

The optical unit 33 is accommodated in the base 30. The optical unit 33 is installed in a manner to be movable in the optical axis direction. The magnet 344 is attached to the first surface of the optical unit 33, in which the first surface is a surface facing the substrate 344. The magnet 334 is positioned to correspond to the coil 340 of the driving unit 34. The optical unit 33 is composed of a first optical unit 33a corresponding to the first driving unit 34a and a second optical unit 33b corresponding to the second driving unit 34b.

The first optical unit 33a is disposed in the accommodation space 310 in a manner that is linearly movable along the optical axis direction within a range of an electric field which is generated by the coils 340 of the first driving unit 34a, and the second optical unit 33b is mounted in the accommodation space 310 in a manner that is linearly movable within a range of an electric field generated by the coils of the second driving unit 34b. With the linear movement of the second optical unit 33b in the optical axis direction, the distance to the first optical unit 33a and the distance to an image sensor module (see FIGS. 5 and 8) disposed behind the second optical unit 33b in the optical axis direction are adjusted.

The coils 340 of the first driving unit 34a, the magnet 334 combined with the first optical unit 33a, the coils 340 of the second driving unit 34b, and the magnet 334 combined with the second optical unit 33b constitute a magnetic circuit that generates a driving force for performing a zooming function or an automatic focusing function. That is, the magnetic circuit includes the coils 340 mounted on the substrates 344 of the first and second driving units 34a and 34b and the magnets 334 combined with the first and second optical units 33a and 33b.

The coils 340 generate an electric field when supplied with electric current from a power supply provided on the corresponding substrate 344 on which the coils 340 are mounted, and a driving force for moving the first and second optical units 33a and 33b in the optical axis direction is generated due to an interaction between the electric field generated by the coils 340 and the magnetic field generated by the magnets 334. The first and second optical units 33a and 33b linearly move in the accommodation space 310 of the base 30. In this case, the direction and distance of the movement of each of the first and second optical units 33a and 33b depends on the direction and magnitude of electric current supplied to the coil 340.

Depending on the movement of the optical unit 33 in the optical axis direction in the accommodation space 310, the distance between the optical unit 33 and the image sensor module 5 (see FIGS. 5 and 8) disposed behind the second optical unit 33b is adjusted in the direction in which light travels. In this way, zooming or automatic focusing is performed. That is, zooming and automatic focusing are performed by moving the first and second optical units 33a and 33b to become closer to or farther from the image sensor module 5.

Each of the first and second optical units 33a and 33b includes a carrier 330 and a lens barrel 332. The carrier 330 linearly moves in the optical axis direction in the accommodation space 310, and the magnet 334 is attached to a side surface of the carrier 330, the side surface facing the driving unit 34. In addition, the lens barrel 332 is disposed in an accommodation hole formed in the center of the carrier 330 and contains a group of lenses. In the lens group, each of the lenses has the same or different optical characteristics such as focal length and refractive index.

Light passing through the first and second optical units 33a and 33b is imaged on the image sensor module 5 disposed behind the second optical unit 33b in the drawing with respect to the direction in which the light travels. The image sensor module 5 includes a substrate 50 and an image sensor 52 (see FIG. 8) which collects image information from the light incident thereon after passing through the optical unit 33. The collected image information is output to the outside through the substrate 50.

An attractive force is exerted between the carrier yoke 346 of each of the first and second driving units 34a and 34b and the magnet 334 combined with each of the first and second optical units 33a and 33b. Therefore, when the first and second optical units 33a and 33b linearly move along the optical axis due to the driving force described above, each of the first and second optical units 33a and 33b are in close contact with the body 348 of a corresponding one of the driving units 34a and 34b. Therefore, each of the optical units 33a and 33b can stably linearly move along the optical axis direction in the accommodation space 310 without shaking or vibrating.

A pair of ball guides 36 is installed between the body portions 348 of the first and second driving units 34a and 34b and the first and second optical units 33a and 33b. Each of the ball guides 36 is disposed between the first or second optical unit 33a or 33b and the body portion 340 of the first or second driving unit 34a or 34b, thereby enabling smoother and more stable linear motion of the first and second optical units 33a and 33b.

As illustrated in FIG. 1 and FIG. 4, each of the ball guides 36 guiding the first and second optical units 33a and 33b for linear movement in the optical axis direction includes a first groove 360, a second groove 364, and at least one ball 362 disposed between the first groove 360 and the second groove 364 facing each other.

Each of the first grooves 360 extends in the first direction parallel to the optical axis and is formed in a horizontal frame (not denoted by reference numeral) of the four frames constituting each of the body portion 348. Each of the second grooves 364 extends in the first direction and is formed in the outer surface of each of the optical units 33 in a manner to face the first groove 360. In addition, the ball 362 is disposed between the first groove 360 and the second groove 364 facing each other.

The ball 362 is installed such that a portion thereof is accommodated in the first groove 360 and the other portion is accommodated in the second groove 364. The ball 362 performs rolling motion while being accommodated in the first groove 360 and the second groove 364 facing each other when the optical unit 33 moves in the optical axis direction, thereby enabling smooth and stable linear motion of the optical unit 33 in the accommodation space 310.

As illustrated in FIGS. 3 and 5, the two or more Hall sensors 342 are arranged at uniform intervals in the optical axis direction and are provided on each substrate 344. Each of the Hall sensors 342 detects the position of the magnet 334 by using the Hall effect, generates a signal corresponding to the detection result, and outputs the signal. The driver IC 349 recognizes the position of the optical unit 33 in the optical axis direction on the basis of the signal received from the Hall sensor 342 and determines the intensity and direction of electric current to be supplied to each of the coils 340.

Thus, the driver IC 349 recognizes the exact position of the optical unit 33 in the optical axis direction on the basis of the signal output from the Hall sensor 342, determines the control values including the intensity and direction of electric current to be supplied to the coils 340 on the basis of the position information, and performs feedback control on the position of the optical unit 33 in the optical axis direction on the basis of the determined control values. Through these operations, zooming and automatic focusing are performed.

The driver IC 349 moves the optical unit 33 in the optical axis direction by supplying the electric current sequentially to the coils 340, starting from the coil 340 that is closest to the optical unit 33 in the direction of movement of the optical unit 33. At the time of supplying electric current, in the case where the amount of electric current supplied to the coil 340 sharply increases, the electromagnetic force correspondingly increases, resulting in an unstable behavior of the optical unit 33 such as tilting.

Therefore, in order to prevent the optical unit 33 from tilting due to a sharp increase in electric current, a control logic circuit may be used to increase the electric current supplied to each coil 340 in a stepwise manner. That is, a current control logic circuit may be applied to the driving unit 349 to increase the amount of electric current supplied to the coil 340 in a stepwise manner, thereby preventing the optical unit 33 from tiling.

When sequentially supplying electric current to the coils 340 arranged in the direction of movement of the optical unit 33, the driver IC 340 controls the direction of electric current supplied to each coil 340 such that a pulling force and a pushing force are alternately generated by the coils 340 in the direction of the movement of the optical unit 33. More specifically, the driver IC 340 can supply electric current to the coils 340 by varying the direction of the electric current supplied to each of the coils 340 according to the position of the optical unit 33 on the basis of the signal output from the Hall sensor 342.

Preferably, the driver IC 349 controls the electric current such that the electric current flowing in a first direction is supplied to the coil 340 that is closest to the optical unit 33 so as to generate a force of pushing the optical unit 33 in the direction of movement of the optical unit 33 and the electric current flowing in a second direction (reverse direction) is supplied to the coil 340 that is second closest to the optical unit 33 so as to generate a force of pulling the optical unit 33 in the direction of movement of the optical unit 33.

This operation will be described in more detail with reference to FIG. 6.

Figure 6A:
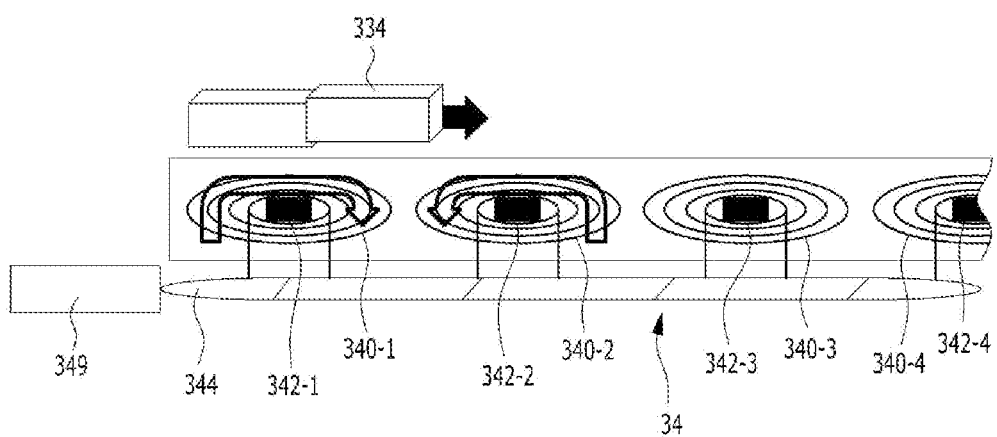
FIG. 6A is a conceptual view illustrating operation of the camera actuator according to the first aspect of the present invention.
Figure 6B:
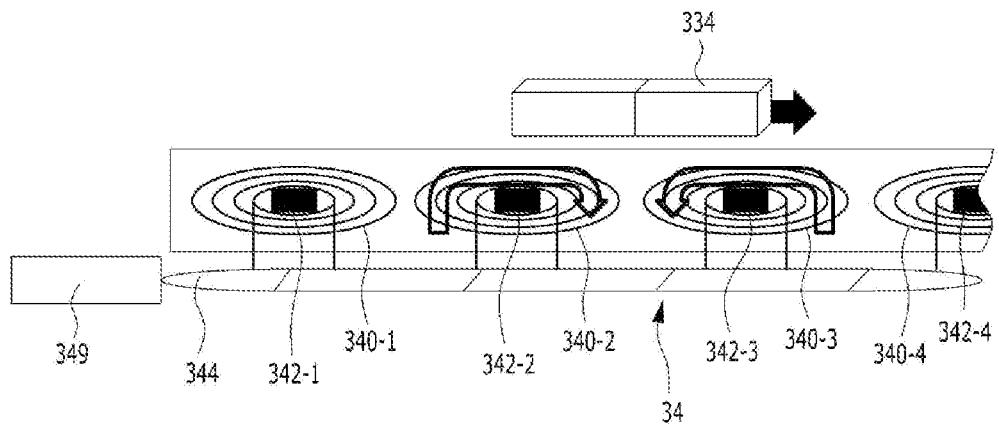
FIG. 6B is another conceptual view illustrating operation of the camera actuator according to the first aspect of the present invention.

FIG. 6 is a conceptual view illustrating the operation of the camera actuator according to an embodiment of the present invention. A configuration in which four coils 340 are arranged on one substrate 344 at uniform intervals along the optical axis direction and four Hall sensors 342 are disposed in the air-core portions 341 of the four coils 340, respectively, will be described as an example. For the convenience of description, the four coils 340 that are arranged in order in the direction of movement of the magnet 334 in FIG. 6 are referred to as first, second, third, and fourth coils 340-1, 340-2, 340-3, and 340-4, respectively. That is, the first coil 340-1 is the leftmost coil and the fourth coil 340-4 is the rightmost coil in the drawing.

Referring to FIG. 6, the driver IC 349 detects the position of the magnet 334 on the basis of the information (Hall value) of the Hall sensor 342, which is lastly input in the preceding process as soon as a driving instruction is input. For example, in case where the magnet 334 is initially positioned to correspond to the first coil 340-1 as shown in (a) of the FIG. 6, the position of the magnet 334 is detected on the basis of the Hall signal output from a first Hall sensor 342-1.

When the magnet 334 is positioned to correspond to the first coil 340-1, the driver IC 349 supplies electric current to the first coil 340-1 flowing in a first direction to generate a repulsive force which pushes the magnet 334 in the direction of arrow, and the driver IC 349 supplies electric current to the second coil 340-2 next to the first coil 340-1 in a second direction (which is reverse to the first direction) to generate an attractive force which attracts the magnet 334.

At this time, when the electric current supplied to each of the first and second coils 340-1 and 340-2 sharply increases, the pushing force (repulsive force) and the pulling force (attractive force) correspondingly sharply increase, thereby causing the optical unit to tilt. This may cause misalignment of the optical axis of the optical unit 33 within the base 30, thereby deteriorating the quality of an image. To prevent this problem, the driver IC increases electric current supplied to the coil 340 in a stepwise manner.

A repulsive force that pushes the magnet 334 occurs due to the interaction between the magnetic field generated by the magnet 334 and the electric field caused by the first coil 340-1 due to the electric current flowing to the first coil 340-1 in the first direction, and an attractive force that pulls the magnet 334 occurs due to the interaction between the magnetic field generated by the magnet 334 and the electric field caused by the second coil 340-2 due to the electric current following to the second coil 340-2 in the second direction which is reverse to the first direction.

The optical unit 33 mounted with the magnet 334 moves toward the second coil 340-2 due to the force (pushing force in the direction of the arrow) generated by the first coil 340-1 and the force (puffing force) generated by the second coil 340-2. When the magnet 334 is detected by the second Hall sensor 342-2 while the magnet 334 moves toward the second coil 340-2, the driver IC 349 changes the direction of electric current supplied to the second coil 340-2. Specifically, electric current flowing in a direction to push the magnet 334 is supplied to the second coil 340-2.

Herein, the interval D between each of the Hall sensors 342 arranged in the optical axis direction is set to be equal to or shorter than the length L of the magnet 334 in the optical axis direction so that the second Hall sensor 342-2 can detect the magnet 334 and the corresponding feedback control can be performed as soon as the magnet 334 exits the sensing range of the first Hall sensor 342-1.

In addition, with the configuration in which only when the Hall sensor 342 senses the magnet 334, the electric current is supplied to the corresponding coil 340, it is possible to cause the electric current to be supplied only to the coil 340 that is involved in the movement of the magnet 334 and to prevent the electric current from being supplied to the other coils 340. In this case, power consumption is reduced.

As illustrated in (b) of FIG. 6, the movement of the magnet 334 toward the third coil 340-3 from the second coil 340-2 is performed in the same manner as the movement toward the second coil 340-2 from the first coil 340-1. In addition, although not illustrated, the movement of the magnet 334 toward the fourth coil 340-4 from the third coil 340-3 may be performed in the same manner. Therefore, a redundant description will be omitted.

With respect to the fourth coil 340-4 which is the last coil, a proportional integral derivative (PID) control may be performed to reduce the moving speed of the magnet 334.

The conventional stepping motor type has a problem in that the overall volume of a compact camera increases due to a large size of a stepping motor. In other words, it is needed to secure sufficient space to accommodate a large stepping motor. This results in an increase in the overall volume of a compact camera.

In addition, since the stepping motor is expensive, the cost of a compact camera increases. Furthermore, since the stepping motor functions to simply move a lens, guide pins are additionally required for alignment of an optical axis of a lens group. Therefore, the conventional stepping motor type is disadvantageous in terms of mass production due to the complicated structure and difficulty in assembling work.

However, since the camera actuator according to the present invention is a VCM type that continually moves an optical unit mounted with a magnet by arranging several coils in the optical axis direction, the structure of the camera actuator is simplified and the driving range (stroke in the optical axis direction) of the optical unit is sufficiently increased compared to the conventional stepping motor type. Therefore, the zooming performance is improved.

In addition, the camera actuator of the present invention is also advantageous in terms of production costs due to the simplified structure compared to the conventional stepping motor type. Furthermore, the simplified structure facilitates assembling work and mass production of camera actuators. Moreover, since the optical unit performs smooth and stable linear motion with the help of the ball guides while being in close contact with the driving unit due to the attraction force between the magnet and the carrier yoke, guide pins for alignment of the optical axis are not required.

In FIG. 1, reference numeral 32 denotes a shielding can surrounding the base 30. The shielding can 32 shields the base 30 from the magnetic field. Reference numeral 336 denotes a back yoke disposed on the back surface of the magnet 334 disposed on the opposite side of the coil 340. The back yoke causes electric fields generated by the coils 340 to converge on the magnet 334.

Figure 7:
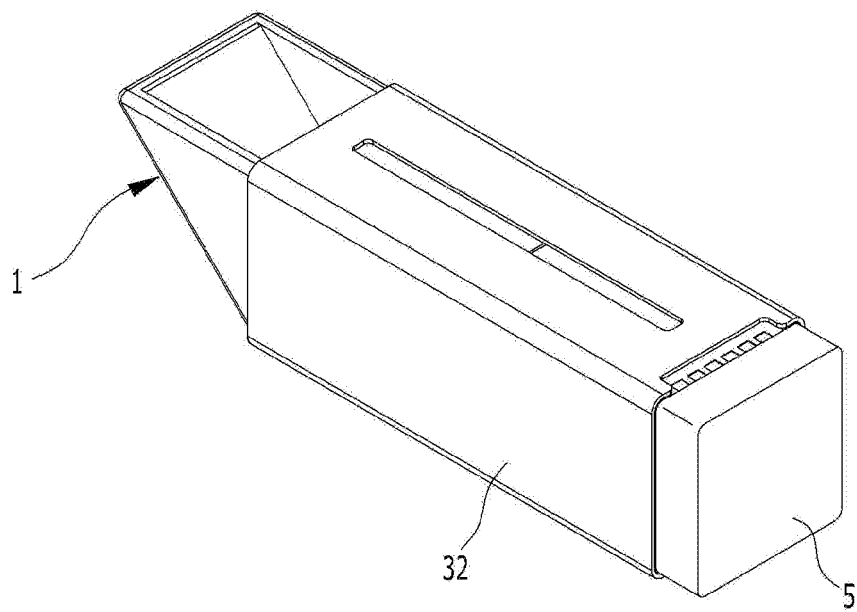
FIG. 7 is an exploded perspective view of a compact camera including the camera actuator according to the first aspect of the present invention.

FIG. 7 is an exploded perspective view of a compact camera including the camera actuator according to the aspect described above, and FIG. 8 is a schematic view illustrating the construction of the compact camera of FIG. 7.

Figure 8:
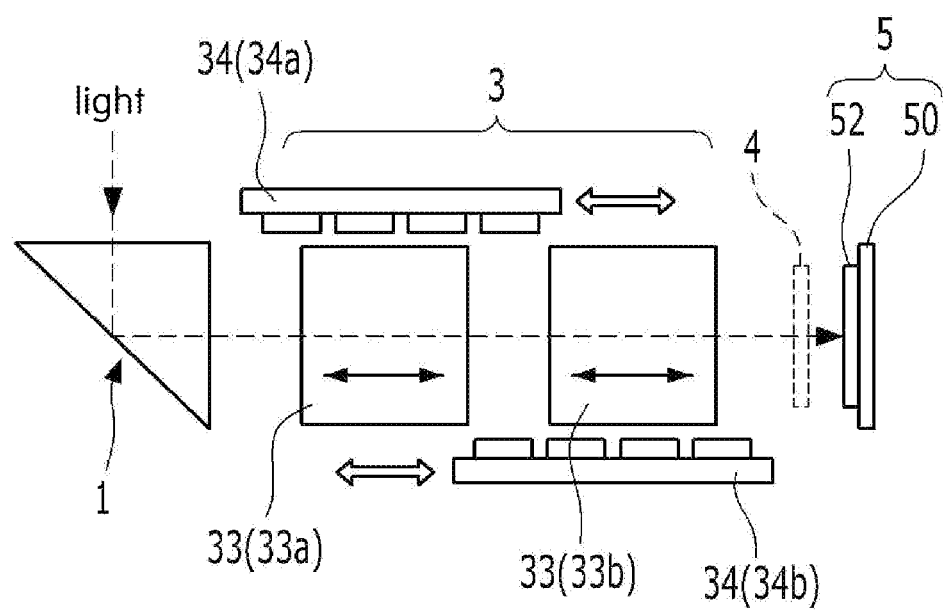
FIG. 8 is a schematic view illustrating the construction of the compact camera in FIG. 7.

Referring to the FIGS. 7 and 8, a compact camera 1 includes a reflectometer 2, a camera actuator 3, and an image sensor module 5. The camera actuator 3 may be the same camera actuator as described above. The reflectometer 2 changes an optical path of light that is incident through an opening or an incident surface of the camera so that the light is guided to the optical unit 33 of the camera actuator 3.

The reflectometer 2 may be a mirror or prism with a reflective surface 20 that is inclined at a specific angle (preferably, 45°) with respect to the incident surface through which light is incident. Two or more optical units 33 constituting the camera actuator 3 are independently moved in the optical axis direction by the two or more driving units, respectively.

In the case where the two or more optical units 33 are independently operated, the range of zooming is increased. Therefore, a high magnification of zooming can be precisely performed. The light passing through the optical unit is imaged on the image sensor module 5 which is disposed behind the optical unit in the direction in which the light travels.

The image sensor module 5 receives the light passing through the optical unit 33 and outputs image information corresponding to the received light. The image sensor module 5 includes a substrate 50 and an image sensor 52 mounted on the substrate 50. The image sensor 52 collects image information from the light passing through the optical unit 33, and the collected image information is output to the outside through the substrate 52.

An IR filter 4 may be installed on the optical path between the camera actuator 3 and the image sensor module 5. The IR filter 4 filters out a specific wavelength included in the incident light Preferably, the IR filter 4 may filter out infrared wavelengths. In this case, the light from which infrared wavelengths are eliminated is projected on the image sensor module 5. Although the drawings illustrate the configuration in which the IR filter 4 is disposed between the camera actuator 3 and the image sensor module 5, the camera according to the present invention is not limited thereto.

The camera actuator 3 enables zooming and automatic focusing of the camera in a manner that the driver device (i.e., IC) senses the exact position of the optical unit 33 in the optical axis direction on the basis of the output signal of the Hall sensor 342, determines the control values including the magnitude and direction of electric current supplied to each coil 340 on the basis of the position information, and performs feedback control on the position of the optical unit 33 in the optical axis direction on the basis of the determined control values.

Although specific exemplary embodiments of the invention have been described, it will be appreciated by those skilled in the art that the present invention is not limited to the specific forms described above. It should be understood that that the scope of the invention cover all of the modifications, equivalents, and substitutes to the specific forms that fall within the spirit and scope defined in the appended claims

What is claimed is:

1. A camera actuator comprising:
   a base having an internal accommodation space being open at both ends thereof in a direction in which light travels, and having at least one opening in a first side surface thereof;
   at least one driving unit including a substrate fitted in the at least opening of the base, the substrate being mounted with at two or more coils on a first surface facing the internal accommodation space of the base; and
   at least one optical unit provided in the internal accommodation space of the base and configured to be movable in an optical axis direction, the optical unit being mounted with a magnet on a surface facing the substrate, the magnet being positioned to correspond to the coils,
   wherein the substrate of the driving unit is mounted with the two or more coils arranged at intervals in a first direction that is parallel to an optical axis,
   each of the coils has an air-core portion in the center thereof, and
   two or more Hall sensors each of which senses a magnetic force of the magnet and which generates and outputs a signal corresponding to the sensed magnetic force are mounted in the air-core portions of the two or more coils, respectively,
   wherein the driving unit further comprises a driver IC mounted on the substrate thereof, and
   the driver IC determines a control value for each of the coils on the basis of an input signal that is externally input and a signal transmitted from each of the hall sensors, and controls intensity and direction of the electric current supplied to each of the coils on the basis of the determined control value,
   wherein the driver IC sequentially supplies the electric current to each of the coils, starting from a coil that is closest to the optical unit in a direction of movement of the optical unit.

2. The camera actuator according to claim 1, wherein the at least one opening comprises a first opening and a second opening that are positioned, respectively, at a first end portion of a first side surface of the base and a second end portion of a second side surface of the base, the first side surface and the second side surface facing each other, the first opening and the second opening being diagonally positioned;
   the at least one driving unit comprises a first driving unit configured to cover the first opening and a second driving unit installed to cover the second opening; and
   the at least one optical unit comprises a first optical unit and a second optical unit arranged, in the accommodating space, side by side in the optical direction, the first optical unit being linearly movable in the optical axis direction within a range of an electric field generated by the coils of the first driving unit, the second optical unit being linearly movable within a range of an electric field generated by the coils of the second driving unit.

3. The camera actuator according to claim 1, wherein each of the driving units comprises:

the substrate mounted with the two or more coils on the first surface thereof and arranged in the optical axis direction and with the two or more Hall sensors mounted in the air-core portions of the two or more coils, respectively;

a carrier yoke disposed in contact with a second surface of the substrate, the second surface being opposite to the first surface on which the coils are mounted; and a rectangular frame-shaped body combined with the substrate and the carrier yoke and fitted in a corresponding one of the openings of the base.

4. The camera actuator according to claim 3, further comprising:

a pair of ball guides disposed between the body of the driving unit and the optical unit and configured to guide the optical unit to linearly move in the optical axis direction.

5. The camera actuator according to claim 4, wherein each of the pair of ball guides comprises:

a first groove formed in a horizontal frame of two horizontal frames extending in a first direction parallel to the optical axis direction, among four frames of the body of the driving unit;

a second groove formed in an outer surface of the optical unit at a position corresponding to the first groove; and one or more balls disposed between the first groove and the second groove corresponding to each other.

6. The camera actuator according to claim 1, wherein the driver IC supplies the electric current flowing in a direction to the coil that is closest to the optical unit so that a first force of pushing the optical unit in the direction of movement of the optical unit is generated and supplies the electric current flowing in the reverse direction to a coil that is second closest to the optical unit so that a second force of pulling the optical unit in the direction of movement of the optical unit is generated.

7. The camera actuator according to claim 1, wherein the optical unit comprises:

a carrier equipped with the magnet mounted on a first side surface thereof to enable linear movement of the optical unit in the optical axis direction; and a lens barrel containing a group of lenses and provided in an accommodation hole formed in a center portion of the carrier.

8. A compact camera comprising:

the camera actuator according to claim 1;

a reflectometer configured to change an optical path of light that is incident through the opening, thereby guiding the light to the optical unit of a zoom lens; and an image sensor module configured to receive light passing through the optical unit of the zoom lens and to output image information corresponding to the received light.

9. The compact camera according to claim 8, wherein the at least one optical unit comprises two or more optical unit, the at least one driving unit comprises two or more driving unit, and the two or more optical units constituting the camera actuator are moved in the optical axis direction, independently of each other, by the two or more driving units, respectively.

* * * * *